July 2, 1957  M. M. REDDI  2,797,546
HEAT MOTORS AND OVERLOAD DEVICES THEREFOR
Filed March 8, 1956
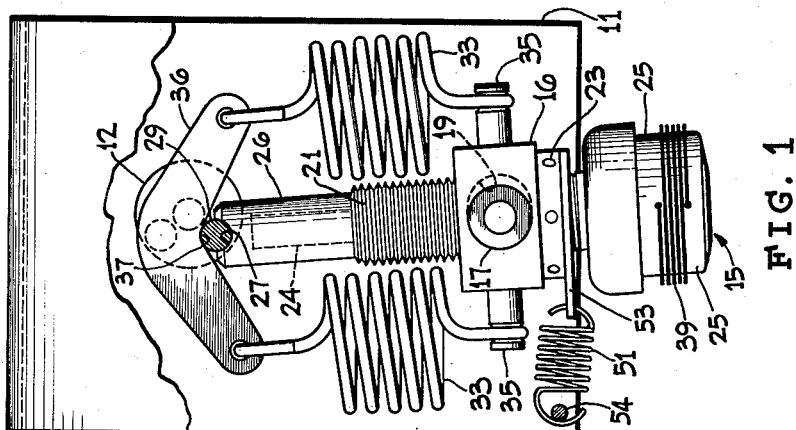
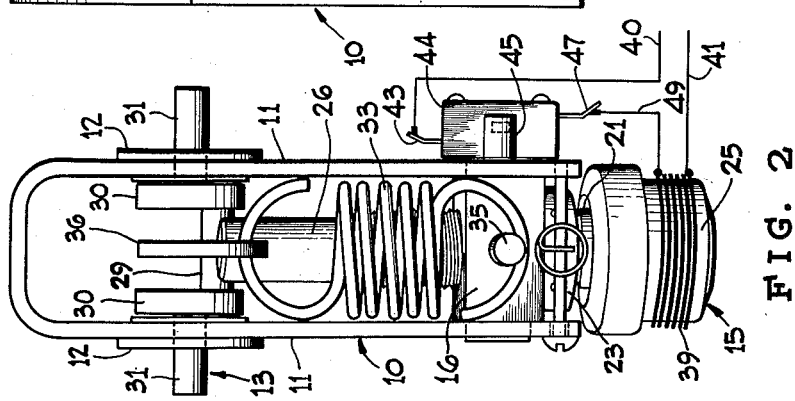
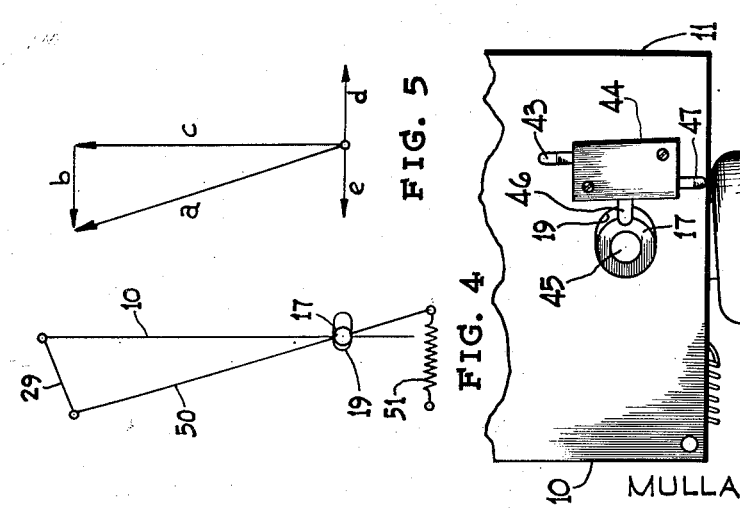
INVENTOR.
MULLAPUDI M. REDDI
BY
ATTORNEYS

United States Patent Office 2,797,546
Patented July 2, 1957

2,797,546

HEAT MOTORS AND OVERLOAD DEVICES THEREFOR

Mullapudi M. Reddi, Chicago, Ill., assignor to The Dole Valve Company, Chicago, Ill., a corporation of Illinois Application March 8, 1956, Serial No. 570,342

8 Claims. (Cl. 60—23)

This invention relates to improvements in heat motors and overload safety devices therefor.

A principal object of the invention is to provide an overload safety device for a heat motor of the type operable by expansion of a thermal element incorporated as a part of the device.

Another object of the invention is to provide a simplified form of overload safety device for a heat motor having an extensible power element and electrically energizable means to heat the motor and effect extensible movement of the power element, in which the electrically energizable means is deenergized by the reactive force of the thermal element on its support, when overload conditions occur.

Still another object of the invention is to provide an overload safety device for a heat motor including a high motion solid fill type of thermal element rockingly carried on a housing and cyclically heated to extensibly move the power member of the thermal element, in which the element is restrained for rocking movement in the housing by spring means, in which the spring means accommodates rectilinear movement of the thermal element with respect to the housing by the reaction of the thermal element against the housing upon overload conditions, rectilinear movement of the thermal element operating to stop operation thereof upon overload conditions thereof.

A still further object of the invention is to provide a heat motor particularly adapted to eject ice cubes from the tray of an ice cube maker operating on the principle of heating a thermal element to effect operation thereof in which the thermal element acts against a crank to operate the ejector mechanism and acts to engage a switch in the energizing circuit for the electric heating means therefor upon jamming of the ejector mechanism, to effect the deenergization of the heating element by the overload reactions thereagainst.

These and other objects of the invention will appear from time to time as the following specification proceeds and with reference to the accompanying drawing wherein:

Figure 1 is a side elevational view of a heat motor constructed in accordance with the invention, with a part of the casing therefor broken away and other parts shown in section;

Figure 2 is an end view of the heat motor shown in Figure 1;

Figure 3 is a fragmentary side elevational view of the heat motor showing the switch in the energizing circuit of the heat motor and the arrangement for deenergizing the circuit upon overload thereof;

Figure 4 is a kinematic diagram of the links involved; and

Figure 5 is a force diagram for the kinematic diagram of Figure 4.

In the embodiment of the invention illustrated in Figures 1 and 2 of the drawings, the heat motor is shown as being carried by a housing 10 generally U-shaped in end view and having parallel spaced side plates 11. The side plates 11 have aligned bearings 12 recessed therein, forming bearings for a cranksshaft 13 operated by a thermal element 15, rockingly carried in said side plates for movement about an axis parallel to the axis of the crank 13.

The mounting for the thermal element 15 is herein shown as being a collar or spider 16 having trunnion pins 17 extending outwardly therefrom and rockingly carried in slots 19 formed in the side plates 11 and accommodating rectilinear movement of the trunnion pins 17 along said slots upon overload conditions, as will hereinafter more clearly appear as the specification proceeds.

The collar 16 is internally threaded and has a cylinder 21 of the thermal element 15 threaded therein and forms an adjustable and rocking support for said thermal element. A lock nut 23 is provided to lock the thermal element in its adjusted position in the collar 16.

The thermal element 15 is shown as being a so-called power or high motion solid fill type of thermal element, such as is shown and described in the Vernet Patent No. 2,368,181, dated January 30, 1945. This thermal element has been selected for its compactness and simplicity, as well as for its extreme power and relatively long range of travel of a power member or piston 24 thereof, slidably guided in the cylinder 21 for extensible movement with respect thereto upon predetermined increases in temperature. In such types of thermal elements, a thermal medium (not shown) in the form of a fusible material is contained within a casing 25 for the thermal element and reacts against a membrane or deformable member (not shown), to extend the power member or piston 24 with respect to the cylinder 21 and casing 25, as the thermal medium reaches its fusion point. The thermal medium may be a wax alone or a wax containing a powdered metal heat conductor and a binder, the material used being selected for its melting or fusion point, and the fusion point thereof determining the temperature range of operation of the thermal element.

The piston 24 is shown as extending within a piston extension 26, abutting the top or outer side of the cylinder 21 when the thermal element is cool. The piston extension 26 has an arcuate recess 27 in its upper end extending transversely thereacross and having engagement with an eccentric shaft 29 of the crankshaft 13. The eccentric shaft 29 is shown as being carried in disks 30 at its opposite ends. The disks 30 are mounted on the inner ends of coaxial output shafts 31 of the crankshaft 13, which are journaled in the bearings 12. The crankshaft 13 and power member 24 are moved in a return direction upon cooling of the thermal element 15 by the bias of spaced tension springs 33, extending along each side of the power member 24 and hooked at their lower ends to pins 35 extending from the collar 16 at right angles to the trunnion pins 17. The springs 33 are hooked at their opposite ends to opposite ends of a yoke 36, shown as being in the form of a modified or flat angle V and having a recessed central arcuate portion 37 having slidable bearing engagement with the eccentric shafts 29 of the crankshaft 13.

A resistor heater 39 is shown as encircling the casing 25 of the thermal element 15. The heater 39 may be selectively energizable by a suitable switch means (not shown), such as, the temperature sensitive switch of an ice cube maker where the heat motor is to be used to eject ice cubes of an ice cube maker, or by any other desired form of switch means operable to close a circuit to the resistor heater 39 through conductors 40 and 41. As herein shown, the conductor 40 has connection with a terminal 43 of a switch 44 secured to a side wall 11 of the housing 10 adjacent a reduced diameter portion 45 of a trunnion pin 17, projecting outwardly from the wall of said housing. The switch 44 may be of any well known form and is herein shown as being a well known form of limit switch having a depressible operating button or plunger 46 in alignment with the reduced diameter portion 45 of the trunnion pin 17, to be engaged by said reduced diameter portion of said trunnion pin upon overload conditions, to break the circuit from the conductor 40 and connector 43 through a connector 47 and conductor 49 connected with the resistor 39, to deenergize said resistor and accommodate the thermal element 15 to cool and stop extensible movement of the power member 24 with respect to the cylinder 21.

As shown in Figure 1, a tension spring 51 is connected at one end to a connector 53 on the cylinder 21 beneath the collar 23 and rocking axis of the thermal element. The opposite end of the spring 51 is connected to a pin 54 connected between the side walls 11 of the housing 10. The spring 51 balances the forces tending to move the thermal element along the slots 19 and normally maintains the trunnion pins 17, against the left hand ends of the slots 19.

Referring now to Figures 4 and 5 showing the kinematic diagram of the links involved and the force diagram for the kinematic diagram, in Figure 4, 29 corresponds to the crank, 10 corresponds to the housing having the slot 19 in the side walls thereof. 50 corresponds to the thermal element 15, its extensible power member 24 and piston extension 26 engageable with the crankshaft for operating the same. 17 designates the trunnion pins on the spider 16. 19 designates the slots in which the trunnion pins are mounted. 51 is the tension spring normally maintaining the thermal element 25 and trunnion pins from rectilinear movement along the slots 19.

In the force diagram for the kinematic diagram shown in Figure 4, *a* is the force produced by extensible movement of the power member 24 reacting against the eccentric shaft 29. *b* and *c* are the components of *a* resolved in a direction parallel to and perpendicular to the axis of the slots 19. *d* is the component parallel to the axis of the slots 19, of the reaction force on the collar or spider 16 and the resultant force on the trunnion pins 17 due to the force transmitted by the power member 24 to the eccentric shaft 29 of the crank 13. *e* is the force of the spring on the collar or spider 16 and trunnion pins 17, tending to keep the trunnion pins toward the left hand ends of the slots 19, and keeping the power member 24, eccentric shaft of the crank 13 and trunnion pins in both static and dynamic equilibrium. When the force *a* exceeds a predetermined value, the component of force *b* increases with a resultant increase in the force *d*. Since the force *d* does not increase simultaneously with *e*, the trunnion pins 17 will move along the slots 19 in the direction of the force *d* until the force *d* comes into equilibrium with the force *e* which now increases due to the gradient of the spring 51.

Movement of the trunnion pins 17 along the slots 19 caused by an increase in the force *a* beyond a predetermined safe value, will engage the reduced diameter end portion 45 of the right hand trunnion pin 17 with the plunger 46 of the limit switch 44 and shut off said switch, deenergizing the resistor heater 39.

An extremely simple form of overload release device has, therefore, been provided for a heat motor of the type having an extensible power member and operated by heating the thermal element by resistor heat, which deenergizes the resistor heater by rectilinear movement of the thermal element upon overload conditions, as where the force on the extensible power member is beyond a predetermined safe value and may be caused by jamming of the mechanism operated by the crank as when the heat motor supplies the power for the ejector mechanism of an ice cube maker and the ejector paddles become jammed for one reason or another.

While I have herein shown and described one form in which my invention may be embodied, it will be understood that various modifications and variations thereof may be effected without departing from the spirit and scope of the novel concepts thereof.

I claim as my invention:

1. In a heat motor and safety release therefore, a housing, a thermal element rockingly carried in said housing and including a casing having a power member extensible therefrom upon predetermined increases in temperature, electrically energizable heating means for heating said thermal element to effect extensible movement of said power member with respect to said casing, means operated by said power member for converting the rectilinear movement thereof into rotational movement, the rocking mounting for said thermal element in said casing also accommodating rectilinear movement thereof upon predetermined load conditions on said power member to effect deenergization of said electrically energizable heating means, and means balancing the forces tending to effect rectilinear movement of said thermal element with respect to said housing, and accommodating rectilinear movement thereof upon overload conditions to effect deenergization of said heating means.

2. In a heat motor and safety release therefor, a housing, a thermal element rockingly carried in said housing and also mounted for rectilinear movement with respect to said housing along an axis extending transversely of the axis of rocking movement thereof, said thermal element including a casing containing a fusible thermally expansible material, a power member extensible from said casing upon fusion of the material contained therein, electrically energizable heating means for heating said thermal element to effect extensible movement of said power member with respect to said casing, means operatively connected with said power member for converting the rectilinear movement thereof into rotational movement thereof into rotational movement, and spring means maintaining said thermal element from rectilinear movement with respect to said housing and accommodating rectilinear movement of said thermal element with respect to said housing upon predetermined overloads on said power member to effect deenergization of said electrically energizable heating means for heating said thermal element.

3. In a heat motor and safety release therefor, a housing, a thermal element rockingly carried in said housing and including a casing, a power member extensible from said casing upon predetermined temperature rises, electrically energizable heating means for heating said thermal element to effect extension of said power member with respect to said casing, means directly connected with said power member for converting the rectilinear movement thereof into rotational movement, the rocking mounting of said thermal element in said housing also accommodating rectilinear movement of said thermal element with respect to said housing upon predetermined overload conditions, spring means connected between said thermal element and housing for restraining rectilinear movement of said thermal element with respect to said housing upon normal load conditions, and switch means operated by rectilinear movement of said thermal element with respect to said housing against the bias of said spring means upon overload conditions and operable to deenergize said electrically energizable heating means and relieve the load on said thermal element.

4. In a heat motor and safety release therefor, a housing, a thermal element within said housing including a casing having a power member extensibly movable with respect to said casing upon predetermined increases in temperature, electrically energizable heating means for heating said thermal element to effect extensible movement of said power member, spring means for returning said power member upon the deenergization of said electrically energizable heating means, a crank journaled in said housing in spaced relation with respect to said thermal element, an operative connection between said power member and crank, a rocking mounting for said thermal element in said housing mounting said thermal element for rocking movement with respect to said housing and for rectilinear movement in a direction transverse to the axis of rocking movement of said thermal element, and spring means balancing the tendency of said thermal element to move rectilinearly with respect to said housing under normal load conditions on said power member and accommodating rectilinear movement of said thermal element upon overload conditions, to effect the deenergization of said heating means.

5. In a heat motor and safety release therefor, a housing, a thermal element rockingly carried in said housing and including a casing having a power member extensibly movable with respect thereto upon predetermined increases in temperature, electrically energizable heating means for heating said thermal element, spring means for returning said power member upon deenergization of said electrically energizable heating means, a crank journaled in said housing in spaced relation with respect to said casing, an engaging connection between said power member and crank to rotate the same upon extensible movement of said power member, the rocking mounting for said thermal element in said housing also accommodating rectilinear movement of said thermal element in a direction transverse to the axis of rocking movement thereof, a spring connected between said housing and thermal element for restraining rectilinear movement of said thermal element with respect to said housing, and a switch connecting said electrically energizable heating means in an energizing circuit and mounted on said housing to be engaged by and moved to an open position upon rectilinear movement of said thermal element with respect to said housing effected by overload on said power member, to accommodate retractible movement of said power member.

6. In a heat motor and safety release therefor, a housing, a thermal element rockingly carried in said housing and including a casing having a power member extensibly movable with respect to said casing upon predetermined increases in temperature, electrically energizable heating means for heating said thermal element to effect extensible movement of said power member, spring means for returning said power member upon deenergization of said electrically energizable heating means, a crank journalled in said housing in spaced relation with respect to said thermal element, an operative connection between said power member and crank to effect rotational movement of said crank upon extensible movement of said power member, the rocking mounting for said thermal element on said housing including a pin and slot connection accommodating rocking movement of said thermal element and rectilinear movement thereof with respect to said housing upon predetermined overload conditions, means yieldably restraining said thermal element from rectilinear movement with respect to said housing, and switching means engaged by said thermal element upon predetermined overload conditions on said power member, for deenergizing said heating means and relieving the load on said power member and thermal element.

7. In a heat motor and safety release therefor, a housing having generally parallel side walls, a thermal element carried in said housing between said side walls for rocking movement with respect thereto, said thermal element including a casing having a power member extensibly movable with respect to said casing upon predetermined increases in temperature, electrically energizable means for heating said thermal element to effect extensible movement of said power member, spring means for returning said power member upon deenergization of said electrically energizable means, a crank journaled in said side walls in spaced relation with respect to said casing of said thermal element, an engaging connection between said power member and crank to effect rotational movement of said crank upon extensible movement of said power member, spring means for maintaining said engaging connection and returning said power member with respect to said casing, the rocking mounting for said thermal element on said side walls including elongated slots in said side walls, extending transversely of the axis of rocking movement of said thermal element, and pins rockingly mounting said thermal element in said slots and movable along said slots upon overload conditions on said crank, and a spring connected between said housing and thermal element on the opposite side of the axis of rocking movement thereof from said crank and maintaining said pins in engagement with one of the ends of said slots and accommodating movement of said pins along said slots by the reaction of said crank on said power member upon predetermined overload conditions to effect the deenergization of said electrically energizable heating means and to relieve the load on said thermal element.

8. In a heat motor and safety release therefor, a housing having generally parallel side walls, a thermal element carried in said housing between said side walls for rocking movement with respect thereto, said thermal element including a casing having a power member extensibly movable with respect to said casing upon predetermined increases in temperature, electrically energizable means for heating said thermal element to effect extensible movement of said power member, spring means for returning said power member upon deenergization of said electrically energizable means, a crank journaled in said side walls in spaced relation with respect to said casing of said thermal element, an engaging connection between said power member and crank to effect rotational movement of said crank upon extensible movement of said power member, spring means for maintaining said engaging connection and returning said power member with respect to said casing, the rocking mounting for said thermal element on said walls including elongated slots in said side walls extending transversely of the axis of rocking movement of said thermal element and pins rockingly mounting said thermal element in said slots and movable along said slots upon overload conditions on said crank, a spring connected between said housing and thermal element on the opposite side of the axis of rocking movement of said thermal element for said crank for restraining rectilinear movement of said thermal element and accommodating rectilinear movement thereof upon predetermined overload conditions, and switching means completing an energizing circuit to said electrically energizable heating means and opening said circuit by engagement with one of said pins upon rectilinear movement thereof along said slots.

No references cited.